March 29, 1927.
J. P. LIVINGSTON
TRACTOR HITCH
Filed July 31, 1926
1,622,328
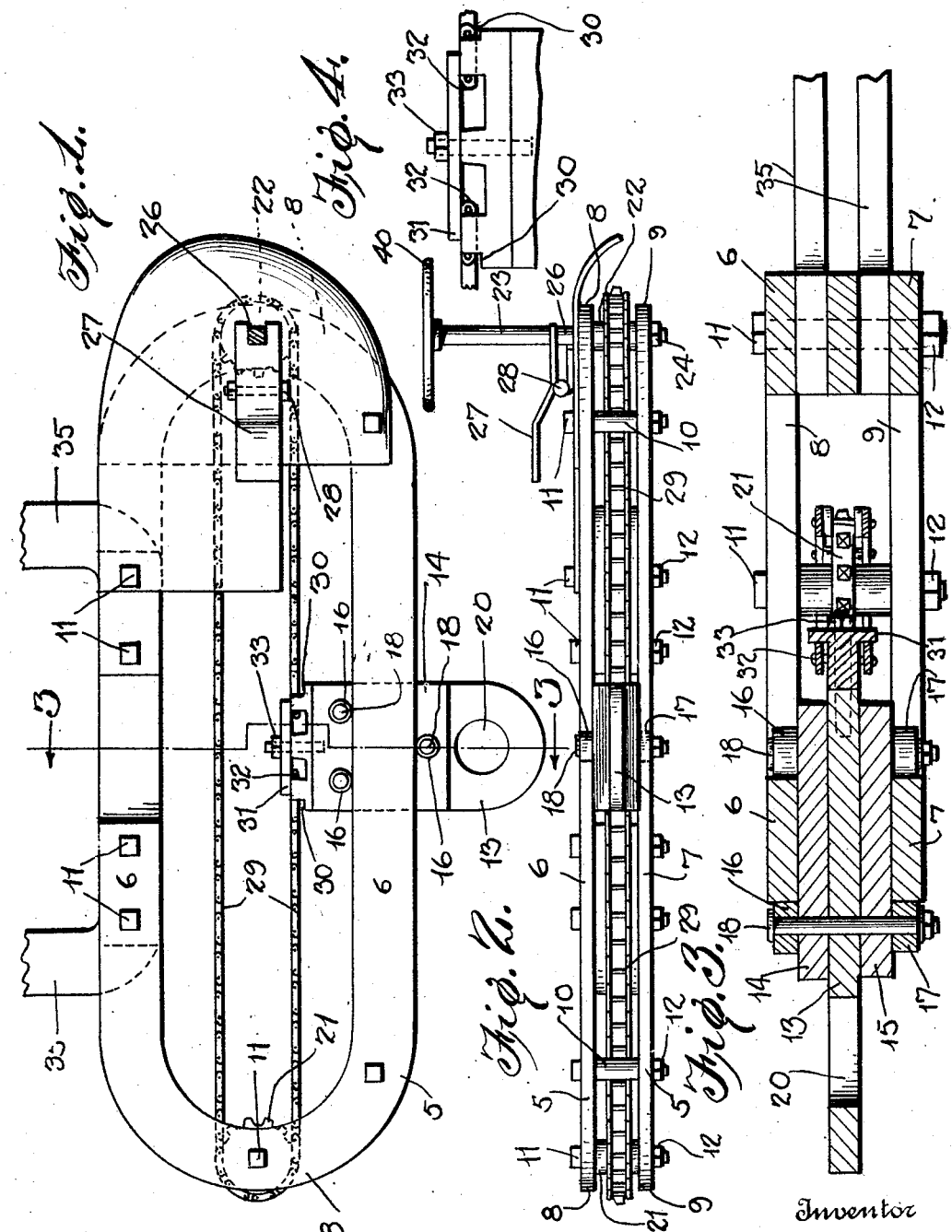

Patented Mar. 29, 1927.

1,622,328

UNITED STATES PATENT OFFICE.

JOHN P. LIVINGSTON, OF CLYDE, NEW YORK.

TRACTOR HITCH.

Application filed July 31, 1926. Serial No. 126,181.

This invention relates to improvements in tractor couplings of the adjustable type.

The primary object of this invention is to provide a device of the above mentioned character adapted to be adjusted in such a manner as to throw the plow or other cultivating apparatus which is being drawn by the tractor out of the path of trees and other objects which may be damaged upon any part of the plow coming in contact therewith.

A further object of this invention is to provide a device of the above mentioned character adapted to be operated by manual power to position the parts in an operative and inoperative position.

A still further object of this invention is to provide a device of the above mentioned character adapted to be easy in operation and construction and comprising comparatively few parts.

Other objects and advantages of the invention will be apparent during the course of the following description.

In the accompanying drawings forming a part of this specification and in which like numerals are employed to designate like parts throughout the same.

Figure 1 is a longitudinal top plan view of the invention;

Figure 2 is a longitudinal side plan view of the same showing the position of the operating hand wheel in respect to the frame;

Figure 3 is a cross section taken on line 3—3 of Figure 1 showing the manner in which the shifting chain is secured to the movable tongue;

Figure 4 is a perspective view of the clamping means for the shifting chain and the movable tongue.

In the drawings, wherein for the purpose of illustration is shown a preferred embodiment of the invention, the numeral 5 designates a pair of spaced elongated frame members having parallel portions 6 and 7 and connected at each end by arcuate portions 8 and 9.

The elongated frame members 5 are held in spaced relation with each other by the spacing bushings 10, held in place by bolts 11, passing therethrough and through the pair of elongated frame members 5. Machine nuts 12 are employed for fastening the bolts 11 in place.

A movable tongue 13, is sandwiched between a pair of complementary wear plates 14 and 15, and is adapted to slide longitudinally between the spaced parallel portions 6 and 7 of the elongated frame member 5. Slide rollers 16 and 17 are carried by each outer face of the wear plates 14 and 15 and are adapted to ride on the lateral edges of the parallel portions 6 and 7 of the elongated frame members 5. The rollers 16 and 17 are held in place by bolts 18, which form an axle therefor. An opening 20 is provided in the other end of the movable tongue 13, for connecting with a cultivating tool or other machine which is desired to be used.

Journaled in the arcuate portions 8 and 9 of the elongated frame members 5 are opposite sprocket wheels 21 and 22. The sprocket wheel 21 may be held in place by one of the spacing bolts 11 while the sprocket wheel 22 is carried by the vertical shaft 23 which passes through the spaced elongated frame members and is held in place by any suitable means such as a nut 24. The vertical shaft 23 is provided with a squared portion 26, adapted to be engaged by the corresponding squared portion of the pivoted locking arm 27, pivoted to the frame by the transversely extending bolt 28 as shown in Figure 1.

A sprocket chain 29, passes around the opposite sprocket chains 21 and 22, and has each of its ends clamped between teeth 30 formed on the movable tongue 13 and a lock plate 31, held in place by a bolt 33. It is to be understood that the opening between the adjacent links of the sprocket chain are threaded on the above described teeth formed on the movable tongues 13 and held thereon by the locking plate 31.

The elongated frame may be fastened to a tractor by the connecting brackets 35, sandwiched between the parallel portions 6 and 7 of the elongated frame member 5 and held in place by the spacing bolts 11 and nuts 12 threaded on the other end.

A guard plate 38, is positioned adjacent the vertical lever 23, and the sprocket wheel 22, and is fastened to the elongated frame member 5 by the spacing bolts 11.

Any suitable means for rotating the vertical shaft 23 may be provided such as the hand wheel 40 shown in Figure 2.

It is to be understood that the tractor hitch may be fastened to the tractor not shown by the brackets 35 and that the cultivating implement be fastened to the movable tongue 13, whereupon movement is imparted to the hand wheel 40 to cause the movable tongue to be adjusted longitudinally of the tractor and of the elongated frame member.

It is to be understood that the form of the invention herewith shown and described is to be taken as a preferred example of the same and that various changes in the size, shape and arrangement of parts may be resorted to without departing from the spirit of the invention, or the scope of the subjoined claim.

Having thus described my invention, I claim:—

In a device of the character described, a pair of spaced elongated frames positioned in vertical alinement with each other, a movable tongue slidably carried between the parallel portion of the spaced elongated frames, a pair of complementary wear plates positioned on each side of the movable tongue, adapted to ride on the inner faces of the elongated frames, rollers revolubly carried on each side of the movable tongue adapted to engage the lateral edge of the elongated frames, staggered teeth formed on the movable tongue, opposite sprocket wheels carried between the arcuate portions of the elongated frames, one of said sprocket wheels being mounted on a vertical shaft and the other sprocket wheel carried by one of the elongated frame spacing bolts, a sprocket chain passing around the sprocket wheels, and clamped between the teeth on the movable tongue and the clamping plate, a hand wheel mounted on the upper end of the vertical shaft for imparting motion to the sprocket chain and movable tongue, a connecting U-shaped frame carried between the other parallel portion of the elongated frames, adapted to connect the device to a tractor or the like and a guard plate of a concaved curvature positioned above one of the sprocket wheels and having an opening for the reception of the vertical shaft.

In testimony whereof I affix my signature.

JOHN P. LIVINGSTON.